Jan. 6, 1931.  F. G. LILJENROTH  1,788,114
ABSORPTION REFRIGERATING APPARATUS
Filed June 13, 1927
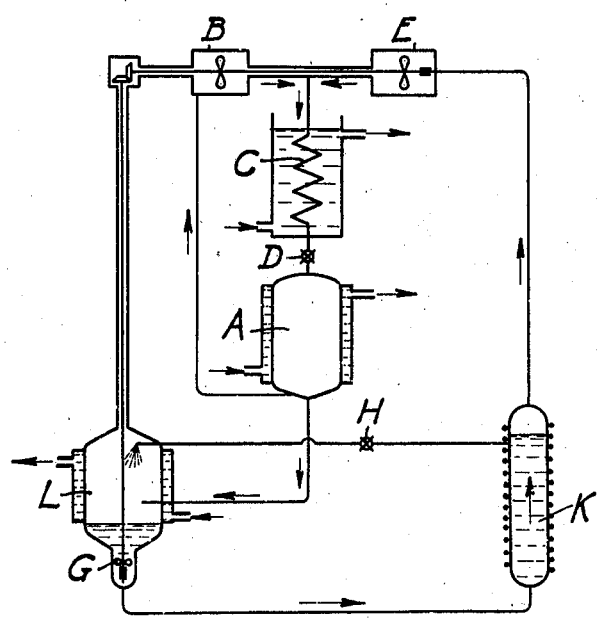
Inventor
Frans Georg Liljenroth,
By
atty.

Patented Jan. 6, 1931

1,788,114

UNITED STATES PATENT OFFICE

FRANS GEORG LILJENROTH, OF STOCKHOLM, SWEDEN

ABSORPTION REFRIGERATING APPARATUS

Application filed June 13, 1927, Serial No. 198,591, and in Sweden June 12, 1926.

This invention relates to a combined absorption and compression refrigerating apparatus.

The object of the invention is to improve in an essential degree the efficiency of the heat supplied to the generator in absorption refrigerating machines. The invention consists, chiefly in combining with such machines a compression refrigerating system in such manner that the evaporator and the condenser are common to both systems and that the compression machinery of the compression refrigerating system is inserted between the generator and the condenser of the absorption refrigerating system and operated by the vapours generated in said generator before they are condensed. When the generator of the absorption refrigerating system is operated at a rather high pressure, say for instance 30 to 40 atmospheres above that of the condenser, the compression refrigerating system will have about the same cooling effect as the absorption refrigerating system while the increase of heat which is required for obtaining the increased pressure in the generator over that of the condenser will be rather small.

In the accompanying drawing I have shown diagrammatically one embodiment of the invention.

Referring to the drawing, A is the evaporator into which liquid ammonia coming from the condenser C through the pressure reducing valve D flows and in which it is evaporated at low temperature and pressure, for instance −10° C. and 3 atmospheres. The heat necessary for this evaporation is taken from a salt solution circulating through the cooling jacket of the evaporator A, said salt solution being thereby cooled and in turn used for maintaining a low temperature, for instance in a cooling chamber or a refrigerator. A part of the gaseous ammonia evaporated in A flows into the absorber L in which it is absorbed in water coming from the generator K through the pressure reducing valve H. The heat thus developed is carried away by cooling water circulating through the cooling jacket of the absorber L. At the bottom of L the ammonia water solution collects, and by means of a pump G said solution is pressed into the generator K which is operated at a rather high pressure, for instance 50 atmospheres and in which the ammonia is expelled from the water by heating. The heat necessary for this purpose is supplied by an electric resistance coil wound around the generator K. The gaseous ammonia flows from K through an engine E in which the ammonia vapour is permitted to expand down to the pressure prevailing in C, i. e. for instance 15 atmospheres, while giving off mechanical energy. From the engine E the ammonia flows directly to the condenser C.

The engine E operates a compressor B in which the ammonia vapour from the evaporator A which is not supplied to the absorber L is compressed and then together with the exhaust vapour from the engine E is supplied to the condenser C. The engine E is also utilized to drive the pump G. The apparatus E, B and G and their connecting means are arranged within the hermetically closed and leakage-free machine.

In the embodiment shown the engine, the compressor and the pump are shown as rotating engines, it being however, of course, also possible to use reciprocating engines.

What I claim is:

1. A combined absorption and compression refrigerating machine, in which the absorption part comprises a generator, a condenser, an evaporator and an absorber and the compression part comprises a compressor machine, said evaporator and said condenser, the compressor machine being inserted between said generator and said condenser and operated by vapour from said generator, before said vapour is condensed.

2. A combined absorption and compression refrigerating machine, in which the absorption part comprises a generator, a condenser, an evaporator and an absorber and the compression part comprises a compressor machine, said evaporator and said condenser, the compressor machine being inserted between said generator and said condenser, and operated by vapour from said generator, before said vapour is condensed, all said elements forming together a hermetically closed system enclosing all movable parts of the machine.

In testimony whereof I have signed my name.

FRANS GEORG LILJENROTH.